Aug. 13, 1963 C. L. FRY 3,100,565
ENDLESS BELT FOR A CONVEYOR-BELT TURN
Filed Oct. 5, 1959 3 Sheets-Sheet 1
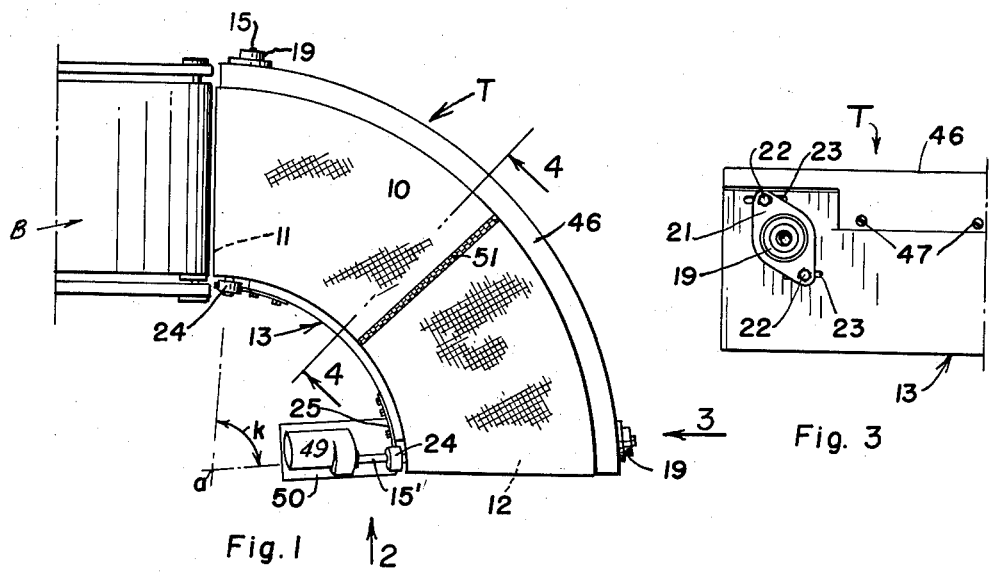
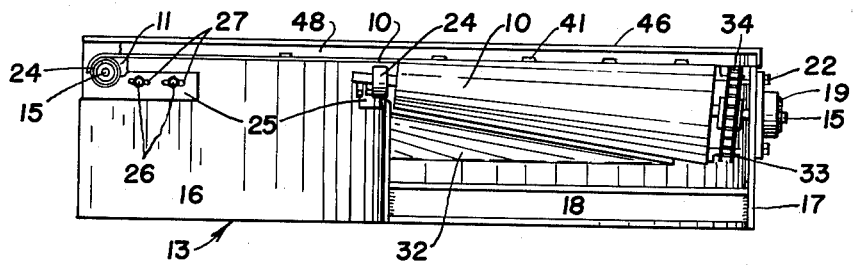
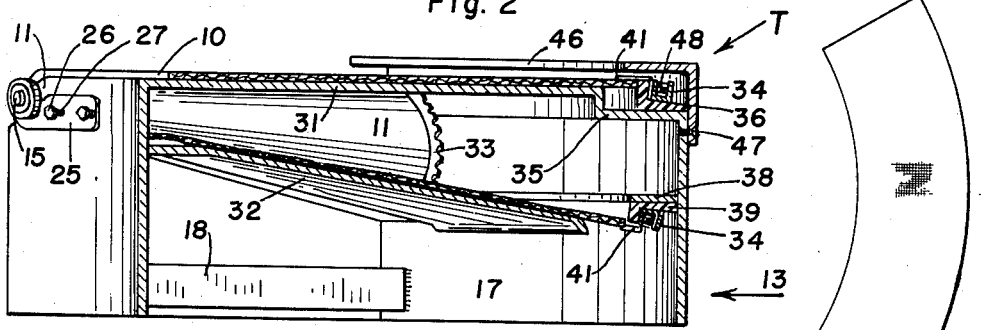
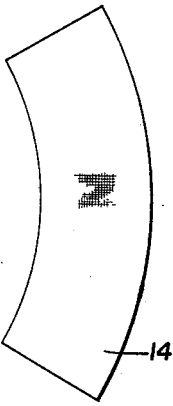
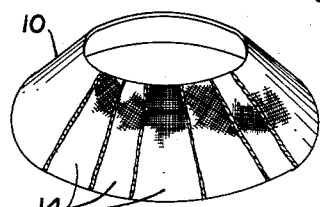
INVENTOR.
Charles L. Fry
BY WHITEHEAD, VOGL & LOWE
PER
ATTORNEYS Aug. 13, 1963 C. L. FRY 3,100,565
ENDLESS BELT FOR A CONVEYOR-BELT TURN
Filed Oct. 5, 1959 3 Sheets-Sheet 2
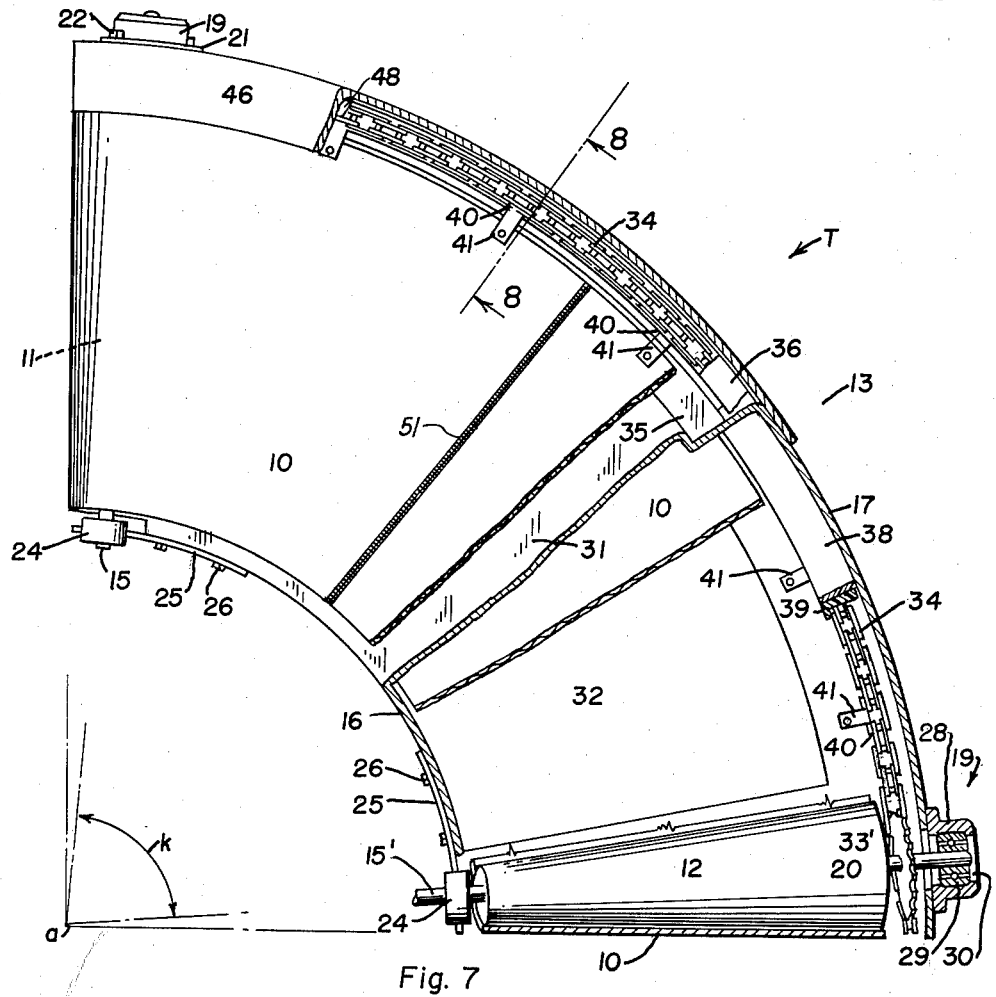
Fig. 7
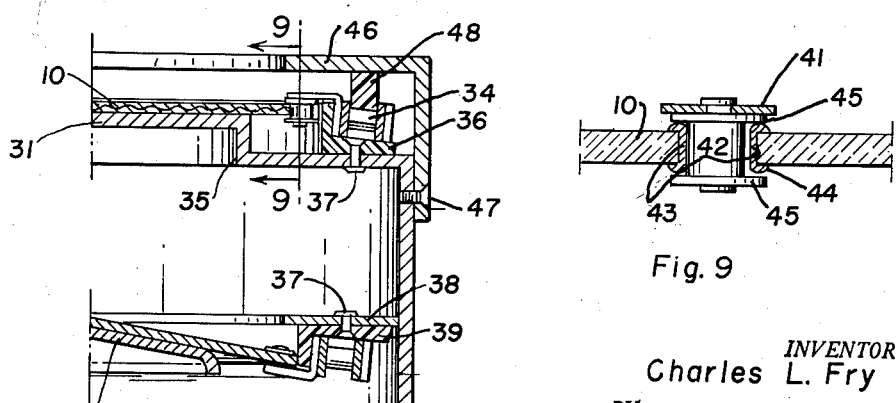
Fig. 8
Fig. 9
INVENTOR.
Charles L. Fry
BY WHITEHEAD, VOGL &
LOWE
PER *Frank C. Lowe*
ATTORNEYS Aug. 13, 1963  C. L. FRY  3,100,565
ENDLESS BELT FOR A CONVEYOR-BELT TURN
Filed Oct. 5, 1959  3 Sheets-Sheet 3

INVENTOR.
Charles L. Fry
BY WHITEHEAD, VOGL & LOWE
PER
*Frank C. Lowe*
ATTORNEYS

United States Patent Office

3,100,565
Patented Aug. 13, 1963

3,100,565
ENDLESS BELT FOR A CONVEYOR-BELT TURN
Charles L. Fry, 3933 Adams St., Denver, Colo.
Filed Oct. 5, 1959, Ser. No. 844,263
4 Claims. (Cl. 198—182)

This invention relates to endless belt conveyors and more particularly to an endless belt conveyor unit adapted to move along a curved path to thereby turn and change the direction of movement of items carried by the unit. The present invention is a continuation in part of my application heretofore filed by me on August 25, 1958, Serial Number 756,982, for a Conveyor Belt Turn, and as such the primary object of the invention described herein is to provide a novel and improved endless belt for an endless belt conveyor adapated to move along a curved path and the invention will be hereinafter referred to as an endless belt for a conveyor-belt turn or as an endless belt for a turn. Another object of the invention is to provide a novel and improved conveyor-belt turn and belt therefor, which is adapted to be incorporated into a conventional conveyor belt system in tandem with other belt units to provide for turning and changing the direction of movement of items carried by the conveyor-belt system or in some instances to offset the items from the conveyor-belt system.

Another object of the invention is to provide a novel and improved conveyor-belt turn and belt therefor which presents a flat, horizontal carrying surface that is adapted to change direction as it moves along its course to thereby turn the direction of movement of items carried thereon.

Another object of the invention is to provide in a conveyor-belt turn a simplified and improved endless belt arranged to lie on a curved path which keeps its form throughout its endless movement about the rollers.

Another object of the invention is to provide a novel and improved endless belt for a turn which is especially adpted to move along a curved path and about roller guides without warping, buckling, or creasing at the upper contact surface of the belt.

Another object of the invention is to provide a novel and improved endles belt for a turn which is of a strong, flexible resiliently-balanced construction without any tendency for favoring flexure along one direction over flexure in another direction and is thereby especially adapted to rotate about the curved path of a turn and over the rollers at each end of the path without a tendency of moving laterally out of position or buckling or piling up on the turn.

Yet other objects of the invention are to provide a novel and improved endless belt for a turn which is of a simple balanced construction, neat appearing, easily installed and adjusted in a conveyor-belt turn, which easily responds to a driving means in a turn and which is a low-cost rugged and durable unit.

With the foregoing and other objects in view, all of which more fully hereinafter appear, my invention comprises certain novel and improved constructions, combinations and arrangements of parts and elements as hereinafter described and as defined in the appended claims and illustrated in the accompanying drawing in which:

FIGURE 1 is a plan view of a turn and the improved belt thereon and being shown as abutting the end of and in tandem with a conventional conveyor belt illustrative of one mode of using the turn.

FIGURE 2 is a front elevational view of the turn per se, as from the indicated arrow 2 at FIG. 1, but on an enlarged scale.

FIGURE 3 is a side elevational view of a fragmentary portion of the turn per se, as from the indicated arrow 3 at FIG. 1, but on an enlarged scale.

FIGURE 4 is a transverse sectional view of the turn per se, as taken from the indicated line 4—4 at FIG. 1, but on a further enlarged scale.

FIGURE 5 is a diagrammatic perspective view of the improved belt such as used in the turn heretofore illustrated, but with the belt being in frusto-conical arrangement, a natural form which the belt may assume, and being illustrated on a reduced scale and with portions and layers being broken away to indicate the nature of the belt construction.

FIGURE 6 is a plan view of a single sector-shaped lamina of the belt.

FIGURE 7 is a plan view of the turn per se, as illustrated at FIG. 1, but on a substantially enlarged scale and with portions of elements being progressively broken away to show parts otherwise hidden from view.

FIGURE 8 is a fragmentary sectional detail view as taken from the indicated line 8—8 at FIG. 7, but on a further enlarged scale.

FIGURE 9 is a fragmentary sectional detail as taken from the indicated line 9—9 at FIG. 8, but on a further enlarged scale.

Figure 10:
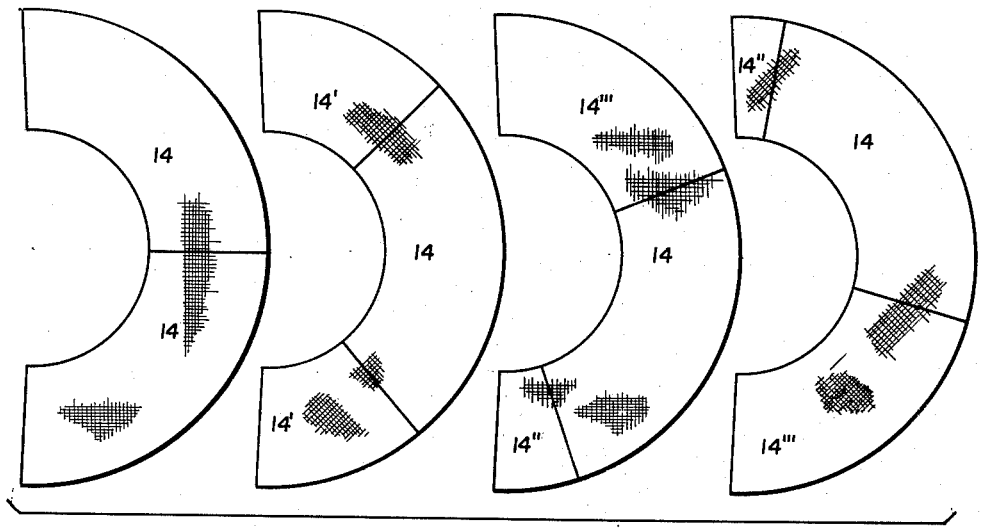
FIGURE 10 is an exploded view of the various belt lamina and layers of the belt as constructed in accordance with the invention.

Conveyor belt systems using flat endless belts find many uses in industry and especially in the field of transportation where packages, cases and the like must be moved from one location to another. Moreover, an endless belt system may be extended a considerable distance by a tandem arrangement of a number of belt units and the design of such a system will necessarily depend upon the arrangement of the building, factory or warehouse.

In many instances it is desirable, and even necessary, to effect a change in the direction of movement of objects carried on an endless belt conveyor. In the past such turning and changing of direction of movement has been accomplished in various ways, as by rotating tables, drops, pusher belts and by endless belt turns. The most desirable type is the latter and several types of endless belt turns have been proposed in the past.

The fundamental principles of operation and construction of an endless belt turn are known. An endless belt of a type which may assume a suitable accurate surface form is mounted between two rollers which are spread apart in a radial pattern to define the termini of the turn. Actually the geometry of a turn is comparatively simple for a belt may assume a general form of a conical frustrum which flattens out to a curved arc and the rollers may be conical with all elements and axes of both terminal rollers extending to a common axis point $a$.

However, in the past it has been impossible to practicably construct and use such a turn using standard conventional belting material. Such material is pliable, but substantially non-stretchable and when mounted between rollers, it will generally warp and buckle because there is a tendency for the belt to move toward the axis point $a$ of the rollers. Also conventional belting is woven in a manner which imparts a rolling quality of the belt about a transverse axis and in a given direction parallel to the weave thereof. The ordinary use of such woven material in a curved belt for a turn is thus not satisfactory because the rolling axis of the belt as about an end of the roller is constantly changing direction with respect to any given direction on the belt surface with a resulting variation of rolling resistance of the belt over the rollers of the turn, tending to shift the belt position on the rollers in an undesirable manner. Stretchable wire belts and restraining means carried on the belts have been proposed with only indifferent success and conveyor belt turns are not in general use.

With such in view, the present invention was conceived and developed and comprises, in essence, an endless belt for a turn which is of a simple structurally improved construction. The belt is carried upon suitable conical rolls and all elements of the turn are carried in frame members which include improved restraining arrangements adapted to hold the belt in a flat, horizontal position and permit it to move without any tendency for it to creep toward the common polar axis point or to wrinkle or buckle as it moves about the turn.

Referring more particularly to the drawing, an improved conveyor belt turn T, hereinafter referred to as a turn, is now illustrated and described as being a preferred type of turn used in connection with the improved belt. The turn is formed as an arcuate endless belt 10 mounted upon and between a head roll 11 and a discharge roll 12. These rolls are mounted in a radially spreading relation in a suitable arcuate frame 13. The turn T is adapted to be coordinated into a conventional conveyor belt system in a number of different ways as by aligning the turn T with a conventional straight conveyor belt B as at the end of the belt B as illustrated at FIG. 1. The other end of the turn may discharge onto another endless belt or discharge on to a slide or the like to permit continued movement of material from the turn. The turn T may be used for still other purposes not suggested herein, either alone or in combination with other conveyor systems.

The turn T is illustrated as encompassing a 90 degree arc, but this arc may be varied from a few degrees to considerably more than 90 degrees, depending upon the arc shift desired. The improved curved belt 10 is arcuate in shape when laid flat, but when open may be formed generally as a frustum of a cone whenever the arc shift is less than 180 degrees, the usual case. The proportions of the belt may be easily determined and the two spreading rollers 11 and 12 whereon the belt is mounted are frusto-conical in form, with their projected apices being at a common point, the common axis point $a$ of the unit.

The belt 10 is made of any pliable non-stretchable material such as ordinary belting which has several layers of webbing laminated together as with vulcanized rubber. To obtain the curved or frusto-conical form having the desired width, the webbing material is cut as a number of arcuate sectors 14 which are overlapped to form several layers and are joined together as by butting sectors of the same layer as illustrated at FIG. 5. The webbing 14 is set as layers of alternating weave in such a manner that one layer has its weave substantially at 45 degrees or on a bias to the adjoining layers as hereinafter further described.

The frusto-conical rollers 11 and 12 will, theoretically, hold the frusto-conical belt in proper position to provide for uniform movement of the various transverse segments of the belt as it rotates in a curved path of an arc. The upper edge or element of each frusto-conical roll is horizontal to hold the upper surface of the belt in a horizontal plane, and in order to provide for a 90 degree turn, or turn of any selected degree, the axis of each roll is set so that the outer edge or element is at a 90 degree arc with the outer edge or element of the other roll. It follows that the axle 15 of the head roll and the axle 15' of the discharge roll are respectively inclined from the horizontal and are spread apart at an angle less than 90 degrees, or any other selected turn degree as at the indicated angle $k$ illustrated at FIG. 7.

In further detail, the framework 13 of the turn may include a vertical arcuate inner wall 16 and a similar vertical arcuate outer wall 17, and both of these walls extend through the 90 degree angle or other seelcted angle of the turn to lie at each side of the belt 10 itself. These wall sections 16 and 17 are innerlocked in any suitable manner as by transverse base struts 18. Each roller, 11 and 12, is mounted upon its respective inclined shaft, 15 and 15', which extends beyond each end of the rollers and to and beyond the walls 16 and 17, to be carried in self-aligning bearings mounted on the walls.

The outer-wall-17-self-aligning bearings 19 fit into suitable orifices 20 which are supported by flanged connections 21, having mounting bolts 22 which are slidable in horizontally mounting holes 23 in the wall 17. Each inner-wall-16-self-aligning bearing 24 is mounted upon a horizontally shiftable plate 25 which is arcuately formed to lie against the surface of the inner wall and to be bolted thereon as by bolts 26 which extend through slotted orifices 27 in the plate 25 to effect the horizontal shiftable movement of the plate. These self-aligning bearings are of a conventional type, and, as illustrated in section at FIG. 7, each bearing includes an outer cylindrical shell 28, a spherical intermediate shell 29 and a bearing race 30 whereon an axle 15 is mounted.

The horizontally-disposed upper surface of the belt 10 rests upon an arcuate table 31 which extends from the inner wall 16 to the outer wall 17 around the unit from the inner edge of each roller as a smooth flat surface whereon the belt 10 may slide. This surface may be of polished metal or otherwise treated to have a low-friction characteristic and to prevent sticking of the belt thereon. The sloping lower surface of the belt is supported on a second table 32 beneath the lower surface of the belt. This table is shaped as a portion of a flat cone attached to the inner wall 16, and is also formed as a smooth, low-friction surface.

The shafts 15 and 15' may also include sprockets 33 and 33' at the outer side of the rollers adjacent to the outer wall 17 and the sprockets are interconnected by a chain 34 of a type which flexes laterally as well as about the axis of the sprocket so that the path of the chain may lie adjacent to the outer wall 17, as illustrated, and alongside the curved outer edge of the belt 10. To accommodate the chain, the upper table 31 is formed with a radially extended pocket 35 at the outer circumference of table 31 adjacent to the outer wall 17. An arcuate angle-shaped guide 36 is mounted in this pocket to support the chain 34 and to hold it in its selected path about the unit. This guide 36 is made of a low-friction material so that the chain may move with ease therein and be molded or shaped. Nylon has been found to be ideal for this purpose. The guide 36 is set in position in the pocket 35 as by countersunk rivets 37 or in any other suitable manner.

An arcuate ledge 38 outstands from the inner surface of the outer wall 17 opposite the table 32 and an arcuate angle-shaped guide 39 of low-friction material extends about the undersurface of this ledge 38 complementary with the guide 36. The chain portion 34 at the lower end of the sprocket is directed about this guide 39 to complete a controlled course of the chain which moves in arcuate paths having a center at the common axis point $a$.

In the past the critical problem involved in the design of a turn and belt therefor has been to hold the belt 10 in proper position along the course of the turn without the belt slipping toward the axis point or without the belt warping and buckling. To solve such problems, flexible belts have been suggested and also belts made of woven wire or the like. Also attempts have been made to hold the belt in a given path as by lugs upon the belt. None of these constructions are satisfactory because of buckling, wrinkling and shifting of the belt on the rollers. However, it was discovered that if the improved belt 10 were held in position on the conical rolls and about the curved path in a loose manner, with some yielding at the restraining points, the belt would move on the curved path without undesirable buckling and wrinkling.

Selected links 40 of the chain 34 are formed with outstanding tongues 41 which overlap the outer edge of the belt 10 and connect therewith. This connection of each tongue to the belt is made in a loose manner to provide for the necessary play discovered to be so essential for smooth operation of the unit. One form of this linkage connection is illustrated at FIGS. 8 and 9 where the tongue 41 includes a cylindrical stud 42 that extends through an orifice 43 in the belt 10. The orifice 43 is reinforced by a grommet 44 having an inside diameter which is substantially larger than the inside diameter of the stud 42. A washer 45 is affixed to each side of the stud 42 and the length of the stud is slightly greater than the width of the grommet 44. This permits substantially a three-dimensional play of the stud 42 within the grommet 44.

To meet the need for freedom of movement at the point of suspension of the belt end to the tongue 41 it would be possible to have other types of yieldable connections. For example, the stud 42 may be encased within a sponge rubber type washer to permit such yieldable connection.

To further restrict the movement of and to protect the chain mechanism, the outer circumferential wall 17 of the unit is overlaid by an angular shield 46 which bolts against the outerside edge of the wall 17 as by bolts 47. A circumferential low-friction restraining guide 48 depends from the under surface of this shield 46 to lie against and to hold the chain 34 in position on the guide 36.

The turn may be operated by any suitable power means and it is preferable to use the discharge roll 12 as the drive in order to keep tension upon the upper surface of the belt 10 as the unit is being operated. This drive means may be any conventional motor unit 49 suitably mounted upon a plate 50 and connected to an extension of the shaft 15' as in the manner clearly illustrated at FIG. 1.

Figure 12:
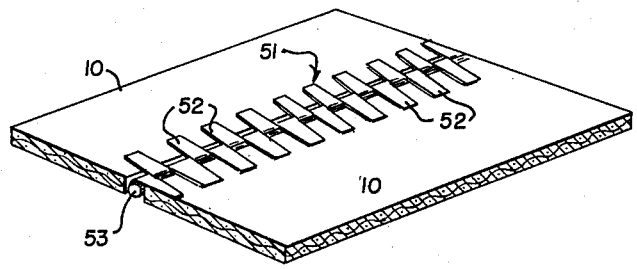
FIGURE 12 is a fragmentary perspective view of a portion of the belt ends and illustrating a preferred manner of interconnecting the ends together.

The improved belt 10 may be an endless unit such as illustrated at FIG. 5 or it may be formed as a flat curved sector and the ends may be joined together by conventional belt lacing 51 which is in the general form of a continuous hinge having the leaf members 52 overlapping the ends of the belt and being affixed thereto in conventional manner and having a centrally axised hinge wire 53 as clearly illustrated at FIG. 12.

The manufacture of this belt 10 should be such that there will be no particular direction where the belt will tend to fold, or resist folding, in a manner characteristic of ordinary woven cloth belts which tend to fold in the direction of the weave, but resist folding diagonal to the weave.

Figure 11:
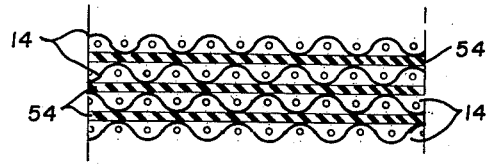
FIGURE 11 is a fragmentary sectional detail diagrammatic in nature and on a greatly enlarged scale illustrating one manner of bonding the several layers of material which constitute the belt.

One preferred mode of manufacturing the improved belt to accomplish this desirable result is illustrated at FIGS. 10 and 11. The illustration shows a four-layer belt, although it is to be understood that a three-layer belt may also be used. Where the belt is to be manufactured as a flat curved unit with the ends thereof adapted to be interconnected as by lacing it is desirable to form the layers as abutted sectors 14 in a manner in which the weave of the cloth of each layer is selectively aligned with respect to the weave direction of the other layers. Because of restricted widths in weaving materials, several sectors 14 will usually have to be butted together to form a single layer and the weave direction of the abutting sectors should be the same. Another restriction is that the lines of abutment of one layer cannot be at the same position as the lines of abutment of another layer for such would materially weaken the belt.

As an example in the illustration at FIG. 10 the first layer may be conceivably formed as two sectors 14 with the abutment edges of the sectors being at the midpoint of the layer and with the weave running in a selected direction, such as at right angles and parallel with the abutting edges. In the next layer, a single sector 14 of the same size as the first and two half sectors 14' at each end of the first, may be used. In the third layer a single sector 14, a quarter sector 14" and a three-quarter sector 14'" may be used to dispose the abutting edges at different locations. In the fourth layer a reverse arrangement of the third layer may be used. The direction of the weave of the material of each layer will be biased from that of the adjacent layers. Further, where the cloth character varies with the weave providing for different physical qualities of the warp and the woof the alternating layers may be further alternatively oriented with respect to each other, so that the warp of one layer is parallel to the woof of the alternating layer and vice versa. With this disclosed arrangement the belt is pliable to turn or fold in any selected direction as it must when moving about the end rollers of the turn.

Moreover, cloth, when pulled on the bias will stretch and a turn belt constructed according to conventional practice, with the warp and woof of all layers being in the same directions, will stretch at certain sections of its arc-form where the bias of the layers is tangentially oriented with respect to the belt form. The term layer as used herein and in the appended claims means a body of cloth-like material formed of threads. Obviously, any given layer can comprise more than one ply. Thus, the term "substantially uniform" layers means either single ply layers or multi-ply layers which are substantially uniform with respect to one another.

The illustration at FIG. 11 is a diagrammatic form suggesting one manner in which these layers of cloth are put together. The cloth layers 14 are bonded between layers of rubber 54, or a similar flexible material. The rubber material 54 is compressed and cured into the cloth under heat and pressure, such being a conventional manner of forming belting.

While I have now described my invention in considerable detail, it is obvious that others skilled in the art can devise and build alternate and equivalent constructions which are nevertheless within the spirit and scope of my invention. Hence, I desire that my protection be limited, not by the constructions illustrated and described, but only by the proper scope of the appended claims.

I claim:

1. An endless belt for a conveyor belt-turn formed as an arcuate sector when lying flat and comprising at least three substantially uniform layers formed of threads, all layers formed of threads and within said belt being of at least substantially uniform cloth-like material and being bonded together as a pliable, flexible non-resilient unit, each of said layers being shaped as said arcuate sector with at least one of said layers comprising a plurality of sections shaped as partial arcuate sectors, said sections abutting end to end to compositely form the shape of said arcuate sector, the threads constituting the warp and woof of the abutting sections shaped as partial arcuate sectors being substantially in common respective directions, the warp and woof of the cloth-like material in each layer being angularly offset with respect to the warp and woof of the cloth-like material in each layer adjacent thereto.

2. An endless belt for a conveyor belt-turn as defined in claim 1 wherein said arcuate sector has opposed opposite free ends, and said belt further includes means to interlock said free ends.

3. An endless belt for a conveyor belt-turn formed as an arcuate sector when lying flat and comprising at least three layers formed of threads, all layers formed of threads and within said belt being of at least substantially uniform cloth-like material and being bonded together as a pliable, flexible non-resilient unit, each of said layers being shaped as said arcuate sector with at least two of said layers each comprising a plurality of sections shaped as partial arcuate sectors, said sections abutting end to end to compositely form the shape of said arcuate sector, the threads constituting the warp and woof of the abutting sections shaped as partial arcuate sectors being substantially in common directions, the warp and woof of the cloth-like material in each layer being angularly offset with respect to the warp and woof of the cloth-like material in each layer adjacent thereto, the abutting ends of said sections in any one layer being staggered with respect to the abutting ends of sections in each layer adjacent thereto.

4. An endless belt for a conveyor belt-turn formed as an arcuate sector when lying flat and comprising at least two layers formed of threads, all layers formed of threads and within said belt being of at least substantially uniform cloth-like material and being bonded together as a pliable, flexible non-resilient unit, each of said layers being shaped as said arcuate sector, at least one of said layers comprising a plurality of sections shaped as partial arcuate sectors, said sections abutting end to end to compositely form the shape of said arcuate sector, the threads constituting the warp and woof of the abutting sections shaped as partial arcuate sectors being substantially in common respective directions, the warp and woof of the cloth-like material in each layer being angularly offset with respect to the warp and woof of the cloth-like material in each layer adjacent thereto by substantially 45°.

References Cited in the file of this patent
UNITED STATES PATENTS

| | | |
|---|---|---|
| 1,482,282 | Adams | Jan. 29, 1924 |
| 1,535,647 | Brennan | Apr. 28, 1925 |
| 1,710,431 | Schlehan | Apr. 23, 1929 |
| 2,141,796 | Loges | Dec. 27, 1938 |
| 2,377,650 | Reimel | June 5, 1945 |
| 2,590,697 | Grove | Mar. 25, 1952 |
| 2,630,603 | Freedlander et al. | Mar. 10, 1953 |